United States Patent [19]

Ames

[11] 4,376,790
[45] Mar. 15, 1983

[54] FEED SUPPLEMENT FOR RUMINANT ANIMALS

[75] Inventor: Stanley R. Ames, Rochester, N.Y.

[73] Assignee: Eastman Kodak Company, Rochester, N.Y.

[21] Appl. No.: 232,492

[22] Filed: Feb. 9, 1981

[51] Int. Cl.³ .......................... A23K 1/22; A23L 1/30
[52] U.S. Cl. .......................................... 426/2; 426/69; 426/635; 426/648; 426/807; 424/317
[58] Field of Search .................... 426/2, 69, 623, 624, 426/630, 635, 636, 648, 807; 424/317

[56] References Cited

U.S. PATENT DOCUMENTS

| | | | |
|---|---|---|---|
| 2,154,449 | 4/1939 | Hoffman et al. | 426/9 |
| 2,729,586 | 1/1956 | Peck | 424/177 |
| 3,413,118 | 11/1968 | Kviesitis | 426/69 |
| 3,564,098 | 2/1971 | Erwin et al. | 424/317 |
| 3,708,578 | 1/1973 | Das | 424/141 |
| 3,806,600 | 4/1974 | Lapore et al. | 424/317 |
| 3,958,009 | 5/1976 | Lepore et al. | 424/317 |
| 4,179,522 | 12/1979 | Huitson | 424/317 |
| 4,183,953 | 1/1980 | Skov et al. | 424/317 |

FOREIGN PATENT DOCUMENTS

| | | | |
|---|---|---|---|
| 1965923 | 8/1969 | Fed. Rep. of Germany . | |
| 1309863 | 3/1973 | United Kingdom | 426/807 |
| 1584857 | 2/1981 | United Kingdom . | |

OTHER PUBLICATIONS

Allison, Bryant & Doetsch, "Studies on the Metabolic Function of Branched-Chain Volatile Fatty Acids", 1962.
Oltjin et al., *J. Nutrition*, vol. 101, pp. 101–112.
Hensley & Moir, *Australian Journal of Agricultural Research*, vol. 14, pp. 509–517, 1963.
Felix et al., *J. Dairy Science*, vol. 63, pp. 1098–1103, 1980.
Cook, *Dairy Notes*, Michigan State University Cooperative Extension Service, Nov. 1973.
Cline et al., *J. Animal Science*, vol. 25, No. 3, pp. 734–739, Aug. 1966.
Bryant & Robinson, *J. Bacteriology*, vol. 84, 1962.
Bryant, *12th Annual Ruminant Nutrition Conference*.
Lassiter et al., *J. Animal Science*, vol. 17, pp. 358–362, 1958.
Allison et al., *Science*, vol. 128, Aug. 29, 1958.

*Primary Examiner*—Raymond N. Jones
*Assistant Examiner*—Elizabeth J. Curtin
*Attorney, Agent, or Firm*—John F. Stevens; Daniel B. Reece, III

[57] ABSTRACT

Disclosed are feed supplement compositions for ruminant animals which are especially effective to increase milk production of cows. The compositions comprise mixtures of ammonium isobutyrate, ammonium valerate, ammonium isovalerate and ammonium 2-methylbutyrate.

44 Claims, 2 Drawing Figures

FEED SUPPLEMENT FOR RUMINANT ANIMALS

TECHNICAL FIELD

This invention relates to compositions of feed or feed supplements containing mixtures of ammonium isobutyrate (AIB), ammonium valerate (AV), ammonium isovalerate (AIV) and ammonium 2-methylbutyrate (A2-MB) for ruminant animals. The compositions have a relatively low degree of odor and corrosivity compared to compositions containing the corresponding acids, providing improved handling and storage characteristics as well as palatability for ruminant animals. When used as feed supplements for dairy cattle, the compositions provide an unexpected increase in milk production without producing any adverse effects.

BACKGROUND ART

There are numerous published articles reporting the differences in digestive processes of ruminant animals as compared with those of monogastric animals. Ruminant digestion is described in considerable detail, for example, by D. C. Church in "Digestive Physiology and Nutrition of Ruminants," Vol. 1, published by D. C. Church, produced and distributed by O.S.U. Book Stores, Inc., Corvallis, Oreg.

The ruminant animal lives on ingested forage consisting of large amounts of cellulose which it cannot digest directly. Instead of direct conversion of the forage, the ruminant animal has evolved a symbiotic relationship with microorganisms, consisting of a variety of bacteria and protozoa. The bacteria digest forage for their own survival and growth and the host ruminant animal later digests the microorganisms and their by-products.

Just as the ruminant animal requires certain preformed nutrients for its growth, the microorganisms upon which it depends for cellulose digestion have their own requirements for essential nutrients. M. P. Bryant and I. M. Robinson (J. Bacteriol. 1962, 84:605) studies the effect of certain compositions, including a mixture of acetic acid, isobutyric acid, valeric acid, isovaleric acid, and 2-methylbutyric acid on essential nutrition for the growth of ruminant microorganisms. Prominent among these microbes are the cellulolytic organisms upon which the ruminant depends. While it has also been shown by others that not all of these volatile fatty acids are required by all of the organisms, at least one is required by each of the 23 for which the combination was shown to provide essential nutrients and each one was essential for at least one of these same 23.

Volatile fatty acids have been shown to be incorporated into the structure of these microorganisms by conversion to characteristic lipids and amino acids, such as ethanolamine plasmalogen, valine, and isoleucine.

These acids are normally present in the rumen as a result of catabolism by the microorganisms of amino acids derived from the protein in the diet of the ruminant animal. Diets high in good quality protein may contain a sufficient supply of CCN precursors for optimal growth of cellulolytic organisms on such diets. However, high-protein diets are expensive and utilize either feedstuffs alternatively convertible to use directly by man or feedstuffs grown on land suitable for the growth of human food crops. It would be desirable to reduce the amount of expensive good quality protein in ruminant feeds and still be able to efficiently utilize cellulose, a foodstuff not utilizable directly by man.

Ruminant nutritionists have shown that during the digestive process, in the rumen of cattle, bacteria break down feed protein to ammonia and fatty acids. The bacteria then use the ammonia to synthesize cellular protein. These bacteria pass from the rumen to the abomasum and the intestine where they are digested and serve as the major source of protein for maintenance of body tissues and for milk production. Extensive studies on the nutrition of rumen bacteria have shown that fiber-digesting bacteria require certain isoacids, such as isobutyric acid, as well as ammonia for synthesis of bacterial protein. (Dairy Notes, November, 1973, p. 7, Dr. Robert M. Cook, Michigan State University published by the Cooperative Extension Service.) Without isoacids, urea or $NH_3$ cannot be utilized by these rumen bacteria. For many years cattle rations have been supplemented with non-protein-nitrogen (NPN) in the form of urea or ammonia.

Patents of interest include U.S. Pat. No. 3,564,098 which discloses a method of improving growth response in ruminants which comprises orally administering certain acids, including valeric acid. Also, U.S. Pat. No. 3,982,028 discloses that volatile fatty acids are absorbed through the rumen walls and are utilized by the animal as primary energy sources. The effects of isoacids (isobutyric, isovaleric, 2-methylbutyric and valeric on milk production were reported in 1980 J. Dairy Sci. 63:1098-1103.

DISCLOSURE OF INVENTION

According to this invention, there is provided a composition comprising a mixture of ammonium isobutyrate, ammonium valerate, ammonium isovalerate and ammonium 2-methylbutyrate which, when used in certain ratios in the mixture, provides surprisingly improved milk production in dairy animals when fed in quantities of about 36 to about 143 grams per day, preferably about 80 to about 105 grams per day. Furthermore, use of the ammonium salts of the acids rather than the acids themselves causes much less corrosion on handling and storage equipment. The ammonium salts provide a much more acceptable food for ruminant animals when compared to the corresponding acids because their odor is much less objectionable.

The feed supplement for ruminants according to this invention comprises, in broad terms,
 (a) about 8-84% by weight of ammonium isobutyrate (AIB), and
 (b) about 92-16% combined weight of
  about 3-63% by weight ammonium valerate (AV), and
  about 3-51% by weight ammonium isovalerate (AIV),
  about 3-67% by weight ammonium 2-methylbutyrate (A2-MB)

The combination of AV, AIV and A2-MB will sometimes be referred to herein as AC-5.

Figure 1:
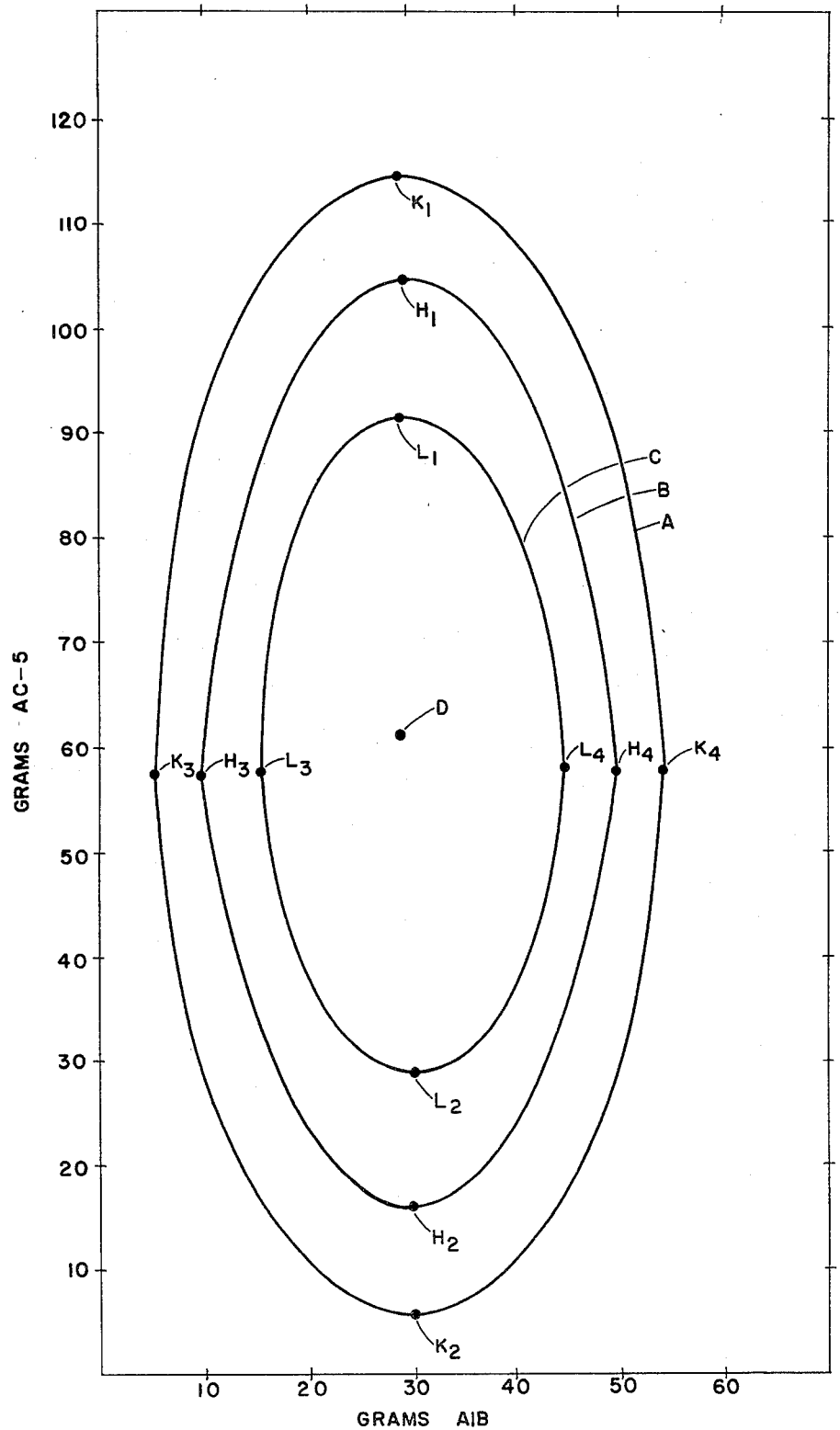
FIG. 1 is a graphic illustration of the most effective ratios of the components AIB and AC-5 and then most effective dose levels.

The present invention therefore provides a ruminant feed composition comprising AIB, AV, AIV and A2-MB. It is often desirable from a production standpoint to produce AV, AIV and A2-MB from the same feedstock. Thus, the composition is sometimes described herein in terms of the combined weights of AV, AIV and A2-MB (AC-5) and the weight of AIB. The results of the experiments which follow enable the calculation of the ranges of compositions and dose levels around the optimum composition and dose level D. These ranges are derived by computer analysis using conventional statistical procedures. FIG. 1 graphically illustrates the compositions as broadly defined within the outer boundary line A, the preferred compositions within intermediate boundary line B, and the most preferred compositions within inner boundary line C. Optimum results are obtained at point D. The anhydrous weights of AIB are shown on the X coordinate while the anhydrous weights of AC-5 are shown on the Y coordinate. The X and Y coordinates of points within the selected boundary lines can be read from the graph. However, coordinates of selected points on the boundaries are shown in the table below.

| Point | AC-5 Dose, grams | AC-5 % of Blend | AIB Dose, grams | AIB % of Blend |
|---|---|---|---|---|
| $L_1$ | 91.68 | 77 | 27.8 | 23 |
| $L_2$ | 29.0 | 50 | 29.9 | 50 |
| $L_3$ | 57.11 | 79 | 14.75 | 21 |
| $L_4$ | 57.75 | 57 | 43.75 | 43 |
| $H_1$ | 106.0 | 79 | 26.73 | 21 |
| $H_2$ | 15.54 | 34 | 30.17 | 66 |
| $H_3$ | 57.11 | 86 | 9.15 | 14 |
| $H_4$ | 57.75 | 54 | 49.25 | 46 |
| $K_1$ | 115 | 81 | 28 | 19 |
| $K_2$ | 6 | 16 | 30 | 84 |
| $K_3$ | 57 | 92 | 5 | 8 |
| $K_4$ | 58 | 52 | 54 | 48 |
| D | 61 | 69 | 28 | 31 |

Usually, the quantity of AIB will be about 8–84%, preferably about 14–66% and most preferably about 21–50%, by weight of the composition, and the quantity of AC-5 will be about 92–16%, preferably about 86–34% and most preferably about 79–50%, by weight of the composition.

Broadly, the ratios of the three components of AC-5 can range from about 3% of each to about 95% of each.

Figure 2:
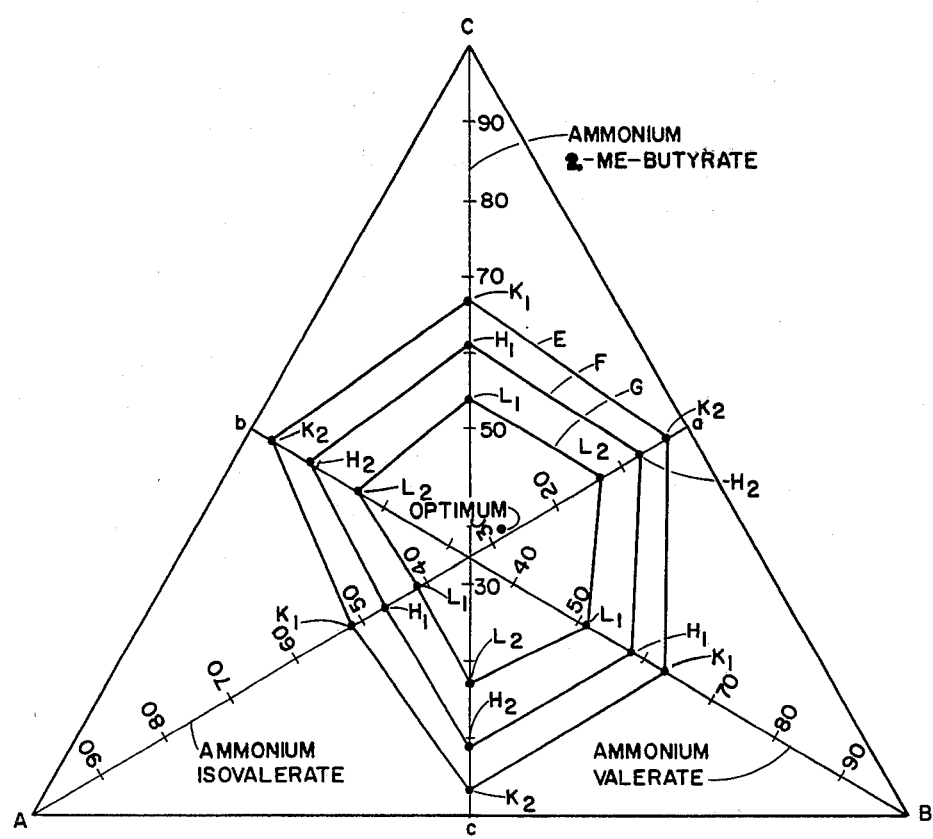
FIG. 2 is a graphic illustration of the most effective ratios of the three components of AC-5.

Usually the ratios of the three components of AC-5 are as illustrated on the triangular coordinate graph of FIG. 2. As can be seen, the ratios of AV, AIV and A2-MB are defined by those compositions inside the outer boundary line E which range from about 3% of each to about 67% of each, based on the total weight of AC-5. The preferred ratios are those contained within the intermediate boundary line F ranging from about 7% of each of about 61% of each, based on the total weight of AC-5. The most preferred ratios are those contained within the inner boundary line G, ranging from about 13% of each to about 54% of each, based on the total weight of AC-5. Unless otherwise specified, the ratio of AV:AIV:A2-MB used hereafter is 35%:28%:37%, on the optimum point D. Coordinates of selected points on the graph are as follows:

$L_1$, $L_2$, $H_1$, $H_2$, $K_1$ and $K_2$ are coordinates representing the maximum and minimum values for each of the AC-5's, respectively. For example, the most preferred range of AV is 16–51% and the broad range is 3–63%.

| Point | Ammonium Valerate, % | Ammonium Isovalerate, % | Ammonium 2-Methylbutyrate, % |
|---|---|---|---|
| $L_1$ | 51 | 41 | 54 |
| $L_2$ | 16 | 13 | 17 |
| $H_1$ | 58 | 46 | 61 |
| $H_2$ | 09 | 07 | 09 |
| $K_1$ | 63 | 51 | 67 |
| $K_2$ | 03 | 03 | 03 |

In some instances, it may be preferable to simply mix the components individually, rather than mixing AC-5 blend with AIB. In any case, these four ammonium salts are preferably put into aqueous solution prior to feeding to animals. A solution containing about 1 to 50% water and about 99 to 50% ammonium salts has been found to be suitable. A preferred solution contains about 20–35% water and about 80–65% ammonium salts. The solution may be admixed with conventional dry feeds, feed concentrates or feed supplements. A roughage component such as silage or haylage can be pretreated with the solution and stored. The solution can also be added to a liquid feed supplement or fed directly as a dilute solution in drinking water. Other convention methods of oral administration can be used.

Although small quantities of the ammonium salts may be fed as a supplement to ruminant animals, doses within the range of 10 to about 150 grams of the anhydrous composition per animal per day are most effective.

The ammonium salts of the acids may be prepared by conventional methods such as treating the corresponding acids individually or in various combinations with anhydrous or aqueous ammonia.

A preferred process is as follows: One or more of the crude aldehydes which have been separated by vacuum distillation from the reaction mass are oxidized to assure nearly complete conversion of the aldehydes to the corresponding acids. The acids are purified by distillation. Aqueous ammonia is produced to a selected concentration. Aqueous ammonia and the acids are metered in the proper proportions to a neutralization reactor.

Although the necessary aldehydes are commercially available, it is preferred that the $C_5$ aldehydes, i.e., valeraldehyde, isovaleraldehyde, and 2-methylbutyraldehyde be made by utilizing a blend of butene-1 and/or -2 and isobutylene feedstocks together in a hydroformylation reaction together with isobutyric acid from a similar reaction on propylene.

The following examples are submitted for a better understanding of the invention.

EXAMPLE 1

A mixed stream of butene-2 and isobutylene (or similar mixed streams of either butene-1 and isobutylene or n-butylenes and isobutylene) was hydroformylated over a catalyst to yield a $C_5$ mixed aldehyde product of the following approximate composition:

Valeraldehyde: 50%
Isovaleraldehyde: 25%
2-Methylbutyraldehyde: 25%

This mixed aldehyde was air oxidized to a mixed acid blend and then mixed with isobutyric acid obtained by the air oxidation of isobutyraldehyde obtained from the hydroformylation reaction on propylene. These mixed acids were reacted with ammonia and found to be useful in making low-cost ruminant feeds.

EXAMPLE 2

The process of Example 1 was carried out but the $C_5$ aldehydes were admixed with isobutyraldehyde prior to air oxidation to acids.

EXAMPLE 3

The process of Example 1 was carried out except that anhydrous ammonia was reacted with the acid blend with or without admixture with water to produce a reaction product useful in making low-cost ruminant feeds.

EXAMPLE 4

The process of Example 1 was carried out except that an aqueous solution of ammonia was reacted with the acid blend to produce a reaction product useful in making low-cost ruminant feeds.

EXAMPLE 5

A ruminant feed was prepared by mixing corn silage, hay, and corn grain to yield a basal ration with about a 9% crude protein content. This ration was then supplemented with 20 to 150 grams/day of the composition according to this invention prepared as in the above examples plus urea to provide a 14% total crude protein level.

The results of efficacy feeding trials at three geographic locations in dairy cows using the composition according to this invention are summarized below and in the tables which follow. Six combinations of AC-5 and AIB defined by the center (CP Blend) and the five points of an equilateral pentagon, from which response surfaces could be computed, and a control were tested. Each treatment consisted of 23 cows for a total of 161 cows in the experiment. The experimental period for each cow started approximately 3-6 weeks prior to calving and included the ensuing lactation and dry periods.

Response surfaces of a surface fitting design, based on milk yield, defined an optimum blend composed of 60.9 g AC-5 plus 27.5 g AIB per cow per day (anhydrous basis). The optimum blend was very similar to the CP blend. The cows receiving the CP blend peaked at higher level and produced significantly more milk than the control cows. In addition, the cows on the CP blend produced significantly more milk protein and solids-not-fat than the controls. The production of fat was higher in the CP treatment than the control but the difference was not significant. The difference in total feed dry matter intake was smaller (and statistically not significant) than the increase in milk production indicating a higher efficiency of feed utilization for the cows receiving the CP blend compared to the controls. There was no adverse blend effect on the health, reproduction, and body weight of the supplemented cows.

The responses were substantially similar in all trials suggesting that the conclusions of this experiment are applicable to other locations.

The composition and levels of supplementation of the mixtures of AC-5 and AIB in aqueous solution that comprised the compositions according to this invention were determined using a surface fitting design. The estimated most effective mixture of AC-5 and AIB was defined as the Center Point (CP). The composition in coded doses of the CP blend was determined by assigning coded doses of 1.0 to both AC-5 and AIB. An equilateral pentagon with the CP blend as its center was inscribed inside a circle with a radius of 0.8 coded doses. The compositions of the five other blends were defined by the five points of the inscribed pentagon. The compositions of the dose levels constituting the CP blend and the five other blends in both coded doses and real doses are shown in Table 3. The dose levels for each blend were defined on anhydrous basis.

The seven treatments consisted of the unsupplemented control (CNTL) and six blends (CP, A, B, C, D and E blends). The blends were fed in admixture with the diet starting approximately 3-6 weeks prior to calving and continuing during the full lactation and during the following dry period. The full dose level was introduced gradually prior to calving and was reduced to two-thirds of full dose level during the dry period. The composition contained about 26% water and about 74% of the composition according to this invention. Tables 1 and 2 show typical results in terms of milk production and weight. The composition and dosage levels for each blend fed during the lactation and dry periods are presented in Table 3. The basal protein-mineral premix was used as a carrier of the composition.

The diets were composed of corn silage, basal protein-mineral premix, corn supplement-1 (C-Suppl-1), and corn gluten meal supplement-2 (CGM-Suppl-2) in proportions estimated to meet National Research Council (NRC) recommended allowances based on milk production and the physiological state of each cow. Except for the seven basal premixes representing the seven treatments, all other diet components were identical for all cows. The compositions of the basal protein-mineral premixes are shown in Table 4. The compositions of C-Suppl-1 and CGM-Suppl-2 as used for Trials 002, 003, and Part 1 of Trial 004 are shown in Table 5. In Part 2 of Trial 004 the compositions of C-Suppl-1 and CGM-Suppl-2 were modified (see Table 6).

The basal protein-mineral premixes were used to provide the specified daily doses (zero dose for the CNTL) of the blends in a form that could be easily handled and subsequently mixed with part or the total diet. The basal premixes were identified by the blend added, i.e., CP, A, B, C, D, and E blends and CNTL. The basal premixes were made isonitrogenous by reducing the urea level to compensate for the nitrogen in the ammonium salts. The premixes were made approximately isocaloric by substituting C-Suppl-1 in the premix for the weight of the anhydrous blend equivalent.

C-Suppl-1 was a grain supplement formulated to provide supplemental energy, and nitrogen for cows producing less than 26 kg of milk daily. Approximately 20% of the total nitrogen in C-Suppl-1 was in the form of urea.

CGM-Suppl-2 was a high protein grain supplement and contained no urea. Corn gluten meal provided the main source of supplemental preformed protein. CGM-Suppl-2 in combination with C-Suppl-1 provided supplemental energy and protein for milk production over 27 kg/day.

The corn silage used was prepared by standard procedures in each loction. No ammonia, urea, or other compounds were added to the corn plant during ensiling. The appropriate basal premix was added to the silage to ensure good distribution of the urea and the supplemented blends.

C-Supp-1 and CGM-Suppl-2 were modified for Trial 004, Part 2. Soybean meal was used to increase the plant protein content of these two grain supplements. The beet pulp was replaced by molasses, corn, and soybean meal. These modifications compensated for the depressed crude protein content of corn grain and corn silage. In addition, these modifications served to supplement the results of the three trials with data from cows fed even higher levels of preformed plant protein and energy especially in the early stages of lactation.

The schedules and methods of feeding were designed to approximate practical field conditions and to allow delivery of the specified dose of the experimental blends. Feeding of the compositions was started prior to calving in order to determine the treatment effect for the entire lactation including the early stages of high milk production. Feeding schedules were identical for all cows and were based on production and physiological stage.

The cows were assigned to treatments approximately 3–6 weeks prepartum. The actual prepartum experimental period varied because individual cows were started on the basis of the expected date of calving which frequently was slightly different than the actual date of calving. The objective of the prepartum feeding schedule was to gradually introduce the cows to the experimental diets including the blends and to provide challenge feeding of grain supplements.

The prepartum feeding schedule provided for *ad libitum* feeding of silage mixed with the basal premix defined by the treatment assignment of each cow. The amount of basal premix was increased from approximately 0 to ⅓ of the daily dosage listed in Table 4 in the third week prepartum to approximately ⅓ of the dose starting two weeks prepartum and approximately ⅔ of the dose starting one week prepartum. In addition all cows were fed 2.0 kg of C-Suppl-1 and 2.0 CGM-Suppl-2 daily starting two weeks prepartum.

The feeding schedule for the lactation period was based on *ad libitum* feeding of corn silage, the appropriate basal premix (Table 4), and variable amounts of C-Suppl-1 and CGM-Suppl-2 according to milk production. The feeding schedule was identical for all treatments and was designed to supply the recommended nutrient allowances for lactating dairy cows.

Challenge feeding was provided during the period between calving and the start of the standardization period by feeding each cow 2.0 kg of C-Suppl-1 and 2.0 kg of CGM-Suppl-2 in addition to the amounts defined by the milk production. The length of this period varied from approximately 1 to 3 weeks depending on how rapidly each cow settled down after calving. The challenge feeding of C-Suppl-1 and CGM-Suppl-2 continued during the first 13 days of the 21-day standardization period. The challenge feeding was subsequently reduced gradually and was discontinued at the end of the standardization period. The feeding schedule for the period starting postpartum and ending at the end of the standardization period resulted in essentially *ad libitum* feeding of diet composed of grain supplements and corn silage in the approximate ratio 60:40 on dry matter (DM) basis. The standardization period was used as the reference interval in the calculation of persistency of milk yield.

Feeding during the dry period is detailed in the feeding schedule in Table 7. The amount of basal premix and experimental Blend fed was reduced to 1.2 kg or approximately two-thirds of the amount fed during the lactation period. Each cow received the same basal premix for the prepartum, lactation, and dry periods.

The feeding schedules for Part 2 of Trial 004 were identical to those described above except that the challenge feeding of 2.0 kg C-Suppl-1 and 2.0 kg CGM-Suppl-2 was continued for approximately 10 weeks postpartum.

In all three locations the basal premixes and the grain supplements C-Suppl-1 and CGM-Suppl-2 were prepared periodically using the ingredients listed in Tables 4, 5 and 6. Some minor modifications were made due to the variation of sources of minerals, trace minerals, and vitamins available in each location.

The experimental design aimed for a standard 305-day lactation and a 60 to 80-day dry period.

Milk yield was the primary parameter used to measure the dairy cow response to the compositions according to this invention.

The response surface analysis of the experimentally measured milk yield for the six treatment blends defined a composition and dose level of 0.96 coded dose AC-5 and 0.90 coded dose of AIB as the most efficacious blend. The coded doses correspond to real doses of 60.9 g AC-5 and 27.5 g AIB (anhydrous basis).

The composition and dose level of the CP blend is similar to the optimum blend and was selected as the center point of the design prior to the start of the trial as the probable most efficacious blend. For these reasons, the experimentally measured milk yield for the CP blend was compared to the untreated control. The cows receiving the CP blend produced significantly more milk than the untreated controls (Table 8). The cows on CP blend peaked at higher level of production and produced more in the period of high production and the total lactation (305-day milk yield).

It is important to note that in each of Trials 002, 003, and Parts 1 and 2 of Trial 004 the cows receiving CP blend produced more milk than the controls (Table 9).

The solids corrected milk yield for the first four months of lactation was higher for the CP blend than the control.

The standardization milk yield used as the reference for computing the persistency of lactation was higher for the CP treatment due to the response of the cows to the administration of the blend which started several weeks prior to calving. As expected, the effect of the reference milk yield on persistency was significant. Despite this effect, the persistency of the CP blend was generally similar or slightly higher than the controls, indicating that the CP blend effect on milk yield was sustained throughout the whole lactation. The persistency for the cows receiving the other blends was generally higher than the control.

The production of protein and solids-not-fat generally paralleled the milk production. The cows receiving the CP blend produced significantly more protein and solids-not-fat than the control in the period of peak production and the first four months of lactation. The 305-day production of protein and solids-not-fat of the CP treatment was significantly higher than the control.

Production of fat was higher for the CP treatment than for the control. However, the difference was not proportional to the increase in milk yield.

Intake of silage DM was very similar for all treatments. Grain supplement DM intake was higher for the CP treatment than for the control in the early stages of lactation. The overall increase in total feed DM intake in the first four months in milk for CP blend over the control was less than 4% compared to a difference in milk yield of approximately 11%. This indicates that the increased milk production for CP blend resulted largely from improved efficiency of utilization of the feed. Due to the design of the feeding schedules the DM ratio of silage to grain supplement (C-Suppl-1 plus CGM-Suppl-2 plus basal premix) was approximately 40:60 during the period of increasing milk production and increased gradually thereafter in inverse relationship to milk production. The overall ratio for the first four months of lactation was 53:47 and for the first eight months of lactation was 65:35. The intake of basal premix averaged 1.38, 1.59 and 1.47 kg DM for the peak, the first four months, and the first eight months of lactation, respectively, indicating that the cows generally consumed the amount of blends offered. Total DM intake averaged 18.8 in early lactation, 18.9 for the first four months, and 18.0 kg for the first eight months of lactation.

Body weight at the start of (or during) the standardization period averaged 578.6 kg. The change in weight for the period of peak production and the first months of high production was not different for the CP treatment compared to the control. In one period there was a loss of 0.7 kg for the control cows compared to a gain of 5.74 kg for the cows receiving the CP blend but the difference was not significant. In another period of the control cows gained slightly more weight than the cows receiving the CP blend but again the difference was not significant. These weight changes indicate that the increased milk yield of the cows receiving the CP blend was not produced at the expense of body tissue.

The blend had no adverse effect on the health of the dosed animals compared to the untreated controls. The incidence and the nature of the diseases observed in the three trials was similar to those of the respective herds.

There was no difference between the control and CP blend on the number of inseminations per cow, the conception rate, the length of the gestation period, the number of calves born alive, or the weight of the calves.

The results of this study led to the following conclusions:

(a) The response surfaces based on milk yield defined an optimum blend composed of 60.9 g AC-5 and 27.5 g AIB per cow per day (anhydrous basis). The optimum blend was very similar to the CP blend.

(b) The cows receiving the CP blend peaked at higher level and produced significantly more milk during the first four months of production than the controls. This significantly higher milk yield of the CP treatment was sustained for the full lactation.

(c) The cows receiving the CP blend produced significantly more milk protein and solids-not-fat than the controls. The production of butterfat for the CP treatment was higher than the control but the difference from the control was not significant.

(d) The increased milk yield of the CP treatment was associated with a proportionately smaller increase of total feed DM intake over the controls. This indicates a higher efficiency of feed utilization for the CP treatment.

(e) There was no adverse blend effect on the health, reproduction and weight change of the supplemented cows compared with the controls.

(f) The responses were largely similar in each of the trials, indicating that the conclusions of this experiment are applicable to other locations.

TABLE 1

| Days From Beginning of Standardization Period[1] | Average Number of Days From Calving | Milk Production, kg/cow/day | | | | | | | Percent Increase CP Over Control |
|---|---|---|---|---|---|---|---|---|---|
| | | Control | Blend A | Blend E | Blend B | Blend CP | Blend D | Blend C | |
| 21 | 36 | 31.0 | 31.1 | 30.9 | 31.9 | 33.8 | 30.6 | 31.7 | 9.1 |
| 63 | 78 | 29.4 | 30.1 | 29.8 | 31.0 | 32.4 | 29.9 | 31.0 | 10.4 |
| 105 | 120 | 27.8 | 28.9 | 28.5 | 29.4 | 30.9 | 28.5 | 29.6 | 11.3 |
| 147 | 162 | 26.2 | 27.3 | 26.8 | 27.7 | 29.1 | 26.9 | 28.1 | 11.0 |
| 189 | 204 | 24.7 | 26.1 | 25.7 | 26.0 | 27.3 | 25.2 | 26.5 | 10.5 |
| 231 | 246 | 23.2 | 24.5 | 24.1 | 24.2 | 25.5 | 23.5 | 25.1 | 10.1 |
| 253 | 268 | 22.3 | 23.6 | 23.3 | 23.3 | 24.6 | 22.5 | 24.3 | 9.9 |

[1]The cows were fed the treatment diets for about three weeks prior to calving.

TABLE 2

| Weight[1] | Weight kg/cow | | | | | | |
|---|---|---|---|---|---|---|---|
| | Control | Blend A | Blend E | Blend B | Blend CP | Blend D | Blend C |
| Day 1[2] | 574 | 596 | 583 | 578 | 606 | 589 | 585 |
| Day 105 | 585 | 602 | 584 | 595 | 605 | 612 | 595 |
| Day 253 | 638 | 647 | 623 | 658 | 656 | 670 | 652 |
| Weight gain 0–104[3] | 11.0 | 2.5 | 2.2 | 17.0 | 6.3 | 22.8 | 13.6 |
| Weight gain 0–250[3] | 64.7 | 47.7 | 47.1 | 79.7 | 57.6 | 80.7 | 67.4 |

[1]Weight based on days from beginning of standardization period.
[2]See footnote 1, table 1.
[3]The weight gain values are not always equal to the difference of weight for the periods noted due to missing values (removed cows) and rounding.

TABLE 3

Calculations of Treatment Dose Levels of Mixed AS-VFA Blend Dairy Cow Efficacy Trials

| Treatments | Percent Composition of Anhydrous Blend | | Real Doses, grams anhydrous blend/cow/day | |
|---|---|---|---|---|
| | AC-5 | AIB | Lactation | Dry Period[1] |
| Control (CNTL) | 0 | 0 | 0 | 0 |
| Center Point (CP) | 67.50 | 32.50 | 94.0 | 62.67 |
| Treatment A | 33.13 | 66.87 | 40.20 | 26.80 |
| Treatment B | 89.69 | 10.31 | 62.26 | 41.51 |
| Treatment C | 84.73 | 15.27 | 128.05 | 85.37 |
| Treatment D | 67.50 | 32.50 | 146.64 | 97.76 |
| Treatment E | 43.74 | 56.26 | 92.85 | 61.90 |

[1]For the dry period, the real doses were set at two-thirds of the real doses of the lactation period.

TABLE 4

Composition and Dosage Levels of Basal Premixes
Dairy Cow Efficacy Trials - Mixed AS-VFA Blend

| Ingredient | Control | Center Point | Blend A | Blend B | Blend C | Blend D | Blend E |
|---|---|---|---|---|---|---|---|
| C-Suppl-1, fine grind | 968 | 874 | 928 | 906 | 840 | 821 | 875 |
| Ground Corn Cobs | 200 | 200 | 200 | 200 | 200 | 200 | 200 |
| Corn Gluten Meal, 60% Protein | 50 | 50 | 50 | 50 | 50 | 50 | 50 |
| Dicalcium Phosphate | 170 | 170 | 170 | 170 | 170 | 170 | 170 |
| Calcium Sulfate | 78 | 78 | 78 | 78 | 78 | 78 | 78 |
| T-M Salt | 54 | 54 | 54 | 54 | 54 | 54 | 54 |
| Magnesium Oxide | 15 | 15 | 15 | 15 | 15 | 15 | 15 |
| Vitamins A and $D_3$ | + | + | + | + | + | + | + |
| Urea | 289 | 265 | 278 | 274 | 257 | 252 | 265 |
| Center Point Blend | — | 94 | — | — | — | — | — |
| Treatment A Blend | — | — | 40 | — | — | — | — |
| Treatment B Blend | — | — | — | 62 | — | — | — |
| Treatment C Blend (as anhydrous blend) | — | 1' | — | — | 128 | — | — |
| Treatment D Blend | — | — | — | — | — | 147 | — |
| Treatment E Blend | — | — | — | — | — | — | 93 |
| | 1824 | 1800 | 1813 | 1809 | 1792 | 1787 | 1800 |

TABLE 5

Compositions of Corn-Supplement-1 (C-Suppl-1) and Corn Gluten Meal-Supplement-2 (CGM-Suppl-2) Dairy Cow Efficacy Trials 002, 003, and Part 1 of Trial 004 - Mixed AS-VFA Blend

| | Dry Matter Basis - % | | As Fed Basis - % | |
|---|---|---|---|---|
| Ingredients | C-Suppl-1 | CGM-Suppl-2 | C-Suppl-1 | CGM-Suppl-2 |
| Shelled Corn | 70.94 | 66.15 | 72.153 | 67.282 |
| Corn Gluten Meal | 3.00 | 22.00 | 2.915 | 21.381 |
| Beet Pulp | 22.00 | 10.00 | 21.381 | 9.719 |
| Dicalcium Phosphate | 1.15 | 0.50 | 1.006 | 0.437 |
| Limestone | — | 0.75 | — | 0.656 |
| Potassium Sulfate | 0.77 | — | 0.673 | — |
| Calcium Sulfate | 0.28 | — | 0.245 | — |
| T-M Salt[1] | 0.45 | 0.45 | 0.394 | 0.394 |
| Magnesium Oxide | 0.11 | 0.15 | 0.096 | 0.131 |
| Vitamins A and $D_3$ | + | + | + | + |
| Urea | 1.30 | — | 1.137 | — |
| | 100.00 | 100.00 | 100.000 | 100.000 |

[1]Commercially available T-M salt for dairy cows was used as follows: Hardy's T-M salt, guaranteed analysis (minimum %): Zn 0.350, Mn 0.200, Fe 0.200, Mg 0.150, Cu 0.030, Co 0.005, I 0.007, NaCl 96.000 (NaCl maximum 98.500%). used T-M Salt, guaranteed analysis (minimum %): Zn 0.200, Mn 0.225, Fe 0.232, Mg 0.100, Cu 0.023, Co 0.007, I 0.007%, S 0.040, NaCl 97.00 (NaCl maximum 98.500%). Morton's T-M salt, guaranteed analysis (minimum %): Zn 0.350, Mn 0.280, Fe 0.175, Cu 0.035, Co 0.007, I 0.007, NaCl 95.00 (NaCl maximum 98.000%).

TABLE 6

Compositions of Corn-Supplement-1 (C-Suppl-1) and Corn Gluten Meal-Supplement-2 (CGM-Suppl-2) Dairy Cow Efficacy Trial 004, Part 2 - Mixed AS-VFA Blend[1]

| | Dry Matter Basis - % | | As Fed Basis - % | |
|---|---|---|---|---|
| Ingredients | C-Suppl-1 | CGM-Suppl-2 | C-Suppl-1 | CGM-Suppl-2 |
| Shelled Corn | 66.747 | 60.332 | 66.511 | 60.394 |
| Soybean Meal | 21.393 | 9.733 | 21.317 | 9.743 |
| Corn Gluten Meal | 2.887 | 21.846 | 2.927 | 21.388 |
| Molasses | 4.218 | 4.213 | 4.988 | 5.005 |
| Dicalcium Phosphate | 1.080 | 0.468 | 0.998 | 0.434 |
| Limestone | 0.187 | 0.899 | 0.166 | 0.801 |
| T-M Salt | 0.600 | 0.449 | 0.532 | 0.400 |
| Dynamate | 0.675 | 1.124 | 0.599 | 1.001 |
| Vitamins A and $D_3$ | 0.937 | 0.936 | 0.831 | 0.834 |
| Urea | 1.275 | — | 1.131 | — |
| | 100.000 | 100.000 | 100.000 | 100.000 |

[1]Contained %: Mg 11.67, K 9.99, Na 0.76, Fe 0.010.

TABLE 7

Feeding Schedule for Dry Cows
Dairy Cow Efficacy Trials - Mixed AS-VFA Blend

| | Basal Premix kg/cow/day | Corn Silage, kg Dry Matter/cow/day | |
|---|---|---|---|
| Cow Live Weight Kilograms | Pregnant and Nonpregnant | Pregnant Cows | Nonpregnant Cows |
| 400–450 | 1.2 | 4.25 | 3.09 |
| 451–500 | 1.2 | 4.70 | 3.44 |
| 501–550 | 1.2 | 5.13 | 3.78 |
| 551–600 | 1.2 | 5.56 | 4.11 |
| 601–650 | 1.2 | 5.98 | 4.43 |
| 651–700 | 1.2 | 6.38 | 4.75 |
| 701–750 | 1.2 | 6.79 | 5.06 |
| 751–800 | 1.2 | 7.18 | 5.37 |
| over 800 | 1.2 | 7.57 | 5.67 |

TABLE 8

Milk Yield and Persistency of Lactation
INAD 1956 - Mixed AS-VFA Blend - Dairy Cow Efficacy Trials

| Item | CNTL | CP | A | B | C | D | E | SEM | CNTL vs CP |
|---|---|---|---|---|---|---|---|---|---|
| Milk Yield, kg/day | | | | | | | | | |
| 000–062 coded days | 30.0 | 33.1 | 31.0 | 31.1 | 31.4 | 29.9 | 30.7 | 0.65 | P < 0.006 |
| 000–104 coded days | 28.3 | 31.5 | 29.6 | 29.4 | 29.9 | 28.4 | 29.1 | 0.64 | P < 0.002 |
| 305-Day Milk Yield, kg | 6603 | 7242 | 6885 | 6720 | 7139 | 6527 | 6806 | 173.4 | P < 0.026 |
| Persistency of Lactation | | | | | | | | | |
| 000–062 coded days | 0.954 | 0.958 | 0.971 | 0.963 | 0.980 | 0.974 | 0.966 | 0.0094 | NS[4] |

TABLE 8-continued

Milk Yield and Persistency of Lactation
INAD 1956 - Mixed AS-VFA Blend - Dairy Cow Efficacy Trials

| Item | Treatment | | | | | | | SEM | CNTL vs CP |
|---|---|---|---|---|---|---|---|---|---|
|  | CNTL | CP | A | B | C | D | E |  |  |
| 000-104 coded days | 0.899 | 0.908 | 0.925 | 0.911 | 0.933 | 0.924 | 0.916 | 0.0126 | NS |

TABLE 9

Individual Trial Milk Yield and Pooled Solids Corrected Milk Yield (000-104 Coded Days)
INAD 1956 - Mixed AS-VFA Blend - Dairy Cow Efficacy Trials

| Item | Treatment | | | | | | | SEM[3] | CNTL vs CP |
|---|---|---|---|---|---|---|---|---|---|
|  | CNTL | CP | A | B | C | D | E |  |  |
| Milk yield, kg/day |  |  |  |  |  |  |  |  |  |
| Trial 002 (MSU) | 27.3 | 30.3 | 28.5 | 29.8 | 29.1 | 27.8 | 28.5 | 0.50 |  |
| Trial 003 (Cornell) | 28.0 | 31.5 | 29.9 | 29.5 | 30.7 | 29.5 | 29.7 | 0.43 |  |
| Trial 004 (VPI) |  |  |  |  |  |  |  |  |  |
| Part 1 | 28.4 | 31.4 | 28.3 | 28.5 | 28.8 | 28.2 | 26.0 | 0.64 |  |
| Part 2 | 30.5 | 34.0 | 32.9 | 29.2 | 30.9 | 27.8 | 32.4 | 0.65 |  |
| Overall means |  |  |  |  |  |  |  |  |  |
| Milk yield, kg/day | 28.3 | 31.5 | 29.6 | 29.4 | 29.8 | 28.4 | 29.1 | 0.64 | P <0.002 |
| Solids corrected |  |  |  |  |  |  |  |  |  |
| milk yield, kg/day | 26.8 | 28.7 | 28.1 | 27.3 | 28.0 | 26.8 | 26.8 | 0.61 | P < 0.058 |

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

I claim:

1. A feed composition for ruminant animals comprising about 8-84% by weight of ammonium isobutyrate, and about 92-16% by weight of a combination of ammonium valerate, ammonium isovalerate and ammonium 2-methylbutyrate.

2. A feed composition according to claim 1 wherein said ammonium valerate, ammonium isovalerate and ammonium 2-methylbutyrate are each present in an amount of about 3-95% by weight, based on their combined weight.

3. A feed composition for ruminant animals comprising about 14-66% by weight of ammonium isobutyrate, and about 86-34% by weight of a combination of ammonium valerate, ammonium isovalerate and ammonium 2-methylbutyrate.

4. A feed composition according to claim 3 wherein said ammonium valerate, ammonium isovalerate and ammonium 2-methylbutyrate are each present in an amount of about 3-95% by weight, based on their combined weight.

5. A feed composition for ruminant animals comprising about 21-50% by weight of ammonium isobutyrate, and about 79-50% by weight of a combination of ammonium valerate, ammonium isovalerate and ammonium 2-methylbutyrate.

6. A feed composition according to claim 1 wherein said ammonium valerate, ammonium isovalerate and ammonium 2-methylbutyrate are each present in an amount of about 3-67% by weight, based on their combined weight.

7. A feed composition according to claim 4 wherein said ammonium valerate, ammonium isovalerate and ammonium 2-methylbutyrate are each present in an amount of about 7-61% by weight, based on their combined weight.

8. A feed composition according to claim 6 wherein said ammonium valerate, ammonium isovalerate and ammonium 2-methylbutyrate are each present in an amount of about 13-54% by weight, based on their combined weight.

9. A feed composition for ruminant animals comprising about 8-84% by weight of ammonium isobutyrate, and about 92-16% by weight of a combination of ammonium valerate, ammonium isovalerate and ammonium 2-methylbutyrate in a ratio of about 0.65-1.25:0.46-1.06:1 respectively.

10. A feed composition for ruminant animals comprising about 8-84% by weight of ammonium isobutyrate, and about 92-16% by weight of a combination of ammonium valerate, ammonium isovalerate and ammonium 2-methylbutyrate in a ratio of about 0.35:0.28:0.37 respectively.

11. A feed composition for ruminant animals comprising about 14-66% by weight of ammonium isobutyrate, and about 86-34% by weight of a combination of ammonium valerate, ammonium isovalerate and ammonium 2-methylbutyrate in a ratio of about 0.65-1.25:0.46-1.06:1 respectively.

12. A feed composition for ruminant animals comprising about 21-50% by weight of ammonium isobutyrate, and about 79-50% by weight of a combination of ammonium valerate, ammonium isovalerate and ammonium 2-methylbutyrate in a ratio of about 0.35:0.28:0.37 respectively.

13. A feed composition according to claim 1 wherein said ammonium valerate, ammonium isovalerate and ammonium 2-methylbutyrate are present in amounts based on their combined weight of about 3-63%, about 3-51% and about 3-67% respectively.

14. A feed composition according to claim 3 wherein said ammonium valerate, ammonium isovalerate and ammonium 2-methylbutyrate are each present in amounts based on their combined weight of about 9-58%, about 7-46% and about 9-61% respectively.

15. A feed composition according to claim 5 wherein said ammonium valerate, ammonium isovalerate and ammonium 2-methylbutyrate are each present in amounts based on their combined weight of about 16-51%, about 13-41% and about 17-54% respectively.

16. An aqueous solution of the composition of claim 1.

17. An aqueous solution of the composition of claim 3.

18. An aqueous solution of the composition of claim 5.

19. An aqueous solution of the composition of claim 9.

20. The solution according to claim 16 containing about 20–35% by weight of water.

21. The solution according to claim 17 containing about 20–35% by weight of water.

22. The solution according to claim 18 containing about 20–35% by weight of water.

23. The solution according to claim 19 containing about 20–35% by weight of water.

24. A feed composition for ruminant animals comprising (a) ammonium isobutyrate and (b) ammonium valerate, ammonium isovalerate and ammonium-2-methylbutyrate in ratios that fall within the area encompassed by boundary line A in FIG. 1.

25. A feed composition for ruminant animals comprising (a) ammonium isobutyrate and (b) ammonium valerate, ammonium isovalerate and ammonium 2-methylbutyrate in ratios that fall within the area encompassed by boundary line B in FIG. 1.

26. A feed composition for ruminant animals comprising (a) ammonium isobutyrate and (b) ammonium valerate, ammonium isovalerate and ammonium 2-methylbutyrate in ratios that fall within the area encompassed by boundary line C in FIG. 1.

27. A feed composition for ruminant animals comprising (a) about 8–84% by weight of ammonium isobutyrate, and (b) about 92–16% by weight of a combination of ammonium valerate, ammonium isovalerate and ammonium 2-methylbutyrate in a ratio which falls within the area encompassed by boundary line E of FIG. 2.

28. A feed composition for ruminant animals comprising (a) about 8–84% by weight of ammonium isobutyrate, and (b) about 92–16% by weight of a combination of ammonium valerate, ammonium isovalerate and ammonium 2-methylbutyrate in a ratio encompassed by boundary line F of FIG. 2.

29. A feed composition for ruminant animals comprising (a) about 8–84% by weight of ammonium isobutyrate, and (b) about 92–16% by weight of a combination of ammonium valerate, ammonium isovalerate and ammonium 2-methylbutyrate in a ratio which falls within the area encompassed by boundary line G of FIG. 2.

30. An aqueous solution comprising the composition of claim 27.

31. An aqueous solution comprising the composition of claim 28.

32. An aqueous solution comprising the composition of claim 29.

33. A method of feeding ruminant animals in order to increase milk production which comprises orally administering to said animals from about 10 to about 150 grams of the composition of claim 1 per day.

34. A method of feeding ruminant animals in order to increase milk production which comprises orally administering to said animals from about 10 to about 150 grams of the composition of claim 3 per day.

35. A method of feeding ruminant animals in order to increase milk production which comprises orally administering to said animals from about 10 to about 150 grams of the composition of claim 5 per day.

36. A method of feeding ruminant animals in order to increase milk production which comprises orally administering to said animals from about 10 to about 150 grams of the composition of claim 9 per day.

37. A method of feeding ruminant animals in order to increase milk production which comprises orally administering to said animals from about 10 to about 150 grams of the composition of claim 16 per day.

38. A method of feeding ruminant animals in order to increase milk production which comprises orally administering to said animals from about 10 to about 150 grams of the composition of claim 19 per day.

39. A method of feeding ruminant animals in order to increase milk production which comprises orally administering to said animals from about 10 to about 150 grams of the composition of claim 20 per day.

40. Composition of matter comprising a feed for ruminant animals having admixed therewith the composition of claim 1 in an amount sufficient to increase milk production when fed to said ruminant.

41. Composition of matter comprising a feed for ruminant animals having admixed therewith the composition of claim 3 in an amount sufficient to increase milk production when fed to said ruminant.

42. Composition of matter comprising a feed for ruminant animals having admixed therewith the composition of claim 5 in an amount sufficient to increase milk production when fed to said ruminant.

43. Composition of matter comprising a feed for ruminant animals having admixed therewith the composition of claim 7 in an amount sufficient to increase milk production when fed to said ruminant.

44. Composition of matter comprising a feed for ruminant animals having admixed therewith the composition of claim 9 in an amount sufficient to increase milk production when fed to said ruminant.

* * * * *